United States Patent
Li et al.

(10) Patent No.: US 9,257,887 B2
(45) Date of Patent: Feb. 9, 2016

(54) BRUSH DC MOTOR WITH PERMANENT MAGNET ROTOR

(71) Applicant: Johnson Electric S.A., Murten (CH)

(72) Inventors: Yue Li, Hong Kong (CN); Chui You Zhou, Hong Kong (CN); Jing Ping Tao, Shenzhen (CN); Hong Jian Zhang, Shenzhen (CN)

(73) Assignee: Johnson Electric S.A., Murten (CH)

( * ) Notice: Subject to any disclaimer, the term of this patent is extended or adjusted under 35 U.S.C. 154(b) by 287 days.

(21) Appl. No.: 13/712,955

(22) Filed: Dec. 12, 2012

(65) Prior Publication Data

US 2013/0147311 A1    Jun. 13, 2013

(30) Foreign Application Priority Data

Dec. 12, 2011    (CN) .......................... 2011 1 0412178

(51) Int. Cl.
  *H02K 13/00*    (2006.01)
  *H02K 13/04*    (2006.01)
  (Continued)

(52) U.S. Cl.
  CPC .............. *H02K 13/006* (2013.01); *H01R 39/00* (2013.01); *H01R 39/04* (2013.01); *H01R 39/38* (2013.01);
  (Continued)

(58) Field of Classification Search
  CPC ................. H02K 23/00; H02K 39/00–39/646; H02K 5/14; H02K 5/143; H02K 47/28; H02K 13/00–13/14; H02K 23/62; H01R 39/00–39/646
  USPC ......... 310/128, 135, 147, 142, 232, 233, 236, 310/248, 136, 235; 318/439, 254, 245
  See application file for complete search history.

(56) References Cited

U.S. PATENT DOCUMENTS 3,036,165 A * 5/1962 Kallin et al. ................ 200/19.09
3,143,730 A * 8/1964 McIntyre .......................... 341/7
(Continued)

FOREIGN PATENT DOCUMENTS

EP    1113569 A1 *  7/2001
FR    2864718 A1 *  7/2005
(Continued)

OTHER PUBLICATIONS

Roos, Gerald; Pierre, Bernard, Electrical Machine Having a Brush Arrangement, Robert Bosch GMBH, Nov. 18, 2010 WO 2010130488 (English Machine Translation).*

(Continued)

*Primary Examiner* — Terrance Kenerly
*Assistant Examiner* — Alexander Singh
(74) *Attorney, Agent, or Firm* — Muncy, Geissler, Olds & Lowe, P.C.

(57) ABSTRACT

A direct current motor has a wound stator, a permanent magnet rotor having a commutator assembly, and brush gear. The brush gear has a first pole brush, a second pole brush and a plurality of commutating brushes. The commutator assembly has a cylindrical insulating base, and first and second members fixed to the base. The first member includes a radially extending first slip ring and a number of axially extending first bars. The second member includes a radially extending second slip ring and a number of axially extending second bars. The first and second pole brushes make continuous sliding contact with the first and second slip rings respectively. The first and second bars are fixed to the outer cylindrical surface of the base and form a cylindrical surface against which the commutating brushes make sliding contact.

17 Claims, 4 Drawing Sheets

(51) Int. Cl.
*H02K 13/10* (2006.01)
*H02K 5/14* (2006.01)
*H02K 23/00* (2006.01)
*H01R 39/00* (2006.01)
*H01R 39/04* (2006.01)
*H01R 39/38* (2006.01)
*H01R 39/39* (2006.01)
*H02K 23/62* (2006.01)

(52) U.S. Cl.
CPC ............... *H01R 39/39* (2013.01); *H02K 5/14* (2013.01); *H02K 5/143* (2013.01); *H02K 13/00* (2013.01); *H02K 13/04* (2013.01); *H02K 13/10* (2013.01); *H02K 23/00* (2013.01); *H02K 23/62* (2013.01)

(56) References Cited

U.S. PATENT DOCUMENTS

| | | | | |
|---|---|---|---|---|
| 3,173,043 | A * | 3/1965 | Newill | 310/128 |
| 3,193,714 | A * | 7/1965 | Hoven | 310/236 |
| 4,091,313 | A * | 5/1978 | Genovese | 388/808 |
| 4,437,029 | A * | 3/1984 | Ban et al. | 310/198 |
| 4,716,330 | A * | 12/1987 | Heyraud | 310/233 |
| 4,792,714 | A * | 12/1988 | Schlieter | 310/234 |
| 6,396,175 | B2 * | 5/2002 | Fujita et al. | 310/51 |
| 6,441,524 | B2 * | 8/2002 | Kaneko et al. | 310/156.45 |
| 7,728,479 | B2 * | 6/2010 | Yokoyama et al. | 310/128 |
| 2007/0046225 | A1 * | 3/2007 | Ahmed | 318/254 |
| 2008/0136288 | A1 * | 6/2008 | Shaw et al. | 310/233 |
| 2011/0057523 | A1 * | 3/2011 | Li et al. | 310/64 |

FOREIGN PATENT DOCUMENTS

| | | |
|---|---|---|
| JP | 4200259 | 7/1992 |
| WO | WO 2009139659 A1 * | 11/2009 |
| WO | WO 2010130488 A1 * | 11/2010 |

OTHER PUBLICATIONS

Servin Alain, Axial switching device for motor vehicle with external winding (English Machine Translation), Jul. 1, 2005, Valeo Systems, FR 2864718.*

* cited by examiner

BRUSH DC MOTOR WITH PERMANENT MAGNET ROTOR

CROSS REFERENCE TO RELATED APPLICATIONS

This non-provisional patent application claims priority under 35 U.S.C. §119(a) from Patent Application No. 201110412178.3 filed in The People's Republic of China on Dec. 12, 2011.

FIELD OF THE INVENTION

This invention relates to a DC motor with a permanent magnet rotor.

BACKGROUND OF THE INVENTION

DC electric motors having a permanent magnet rotor, wound stator coils, a commutator and brushes are generally known as shown in Japanese patent publication JP4-200259. The motor disclosed in this patent publication employs a cylindrical commutator assembly that includes a pair of slip rings and a plurality of commutator bars extending axially from each slip ring. A first pair of brushes that are respectively connected to two poles of a DC power source make continuous sliding contact with the slip rings. A second pair of brushes that are connected to the stator coils, make sliding alternating contact with the commutator bars as the rotor turns. However, this kind of commutator makes the whole DC motor long in the axial direction.

U.S. Pat. No. 6,396,175 discloses a DC motor with a permanent magnet rotor and a commutator assembly having commutator segments and three slip rings, all arranged on a flat or planar surface. While such an assembly allows the motor to have a short axial length it requires a motor with a large radial dimension.

The present invention aims to provide a new DC motor having a permanent magnet rotor that can mitigate the above mentioned problem.

SUMMARY OF THE INVENTION

Accordingly, in one aspect thereof, the present invention provides a direct current motor, comprising: a rotor comprising: a shaft, a rotor core fixed to the shaft, a plurality of permanent magnets fixed to the rotor core, and a commutator; a stator comprising a stator core surrounding the rotor core, and a plurality of coils wound on the stator core; and brush gear comprising a plurality of commutating brushes connected to corresponding coils, a first pole brush, and a second pole brush; wherein the commutator comprises a substantially cylindrical insulating base fixed to the shaft, a first member fixed to the base, and a second member fixed to the base and insulated from the first member; the first member comprises a first slip ring extending radially and a plurality of first bars electrically connected to the first slip ring, the first pole brush making continuously sliding contact with the first slip ring; the second member comprises a second slip ring extending radially and a plurality of second bars electrically connected to the second slip ring, the second pole brush making continuously sliding contact with the second slip ring; and the first bars and the second bars are fixed to the outer surface of the base and are alternately arranged at equally spaced intervals in the circumferential direction of the base and form a substantially cylindrical surface against which the commutating brushes make sliding contact.

Preferably, the first bars are integrally formed with the first slip ring as a single piece stamping, and the second bars are integrally formed with the second slip ring as a single piece stamping.

Preferably, the first slip ring and the second slip ring are arranged at the same side of the first and second bars.

Preferably, the first slip ring is arranged at a side of the base that faces away from the stator, the second slip ring is arranged at a side of the first slip ring facing away from the stator, the second bars extending through the first slip ring.

Preferably, the first slip ring comprises a plurality of recesses at the radially inner edge thereof, the second bars passing through corresponding recesses.

Preferably, the outer diameter of the second slip ring is greater than that of the first slip ring, and the commutating brushes, the first pole brush, and the second pole brush are all arranged on a same side of the first slip ring.

Preferably, the commutating brushes, the first pole brush, and the second pole brush are all disposed between the first slip ring and the rotor core.

Preferably, the brush gear further comprises a substantially ring-shaped brush card, the base, the first bars, and the second bars are surrounded by the brush card, the commutating brushes, the first pole brush, and the second pole brush are received in the brush card.

Preferably, the commutator further comprises a plurality of insulating ribs disposed between adjacent first bar and second bar.

Preferably, the coils are arranged in three phases, the brush gear comprises three commutating brushes, and the commutator comprises three first bars and three second bars.

Preferably, an Angle "α" corresponding to the arc length occupied by one of the commutating brushes on an outer cylindrical surface of the commutator is between 12°-18°, an Angle "β" corresponding to the arc length of a rib is between 21°-27°, an Angle "γ" corresponding to the arc length of the first or second bar is between 27°-33°, and an Angle "δ" corresponding to the circumferential spacing of adjacent commutating brushes is between 34°-46°.

Preferably, a plurality of first diodes and a plurality of second diodes are provided, wherein the coils correspond to a plurality of phases, each phase being connected to a positive power source via the first diode and to a negative power source via the second diode, with the anode of the first diode and the cathode of the second diode connected to the phase.

Preferably, the magnets are embedded in the rotor core.

Preferably, the magnets are fixed in grooves formed in the rotor core, the grooves extending radially and axially of the rotor core with the magnets being alternately polarised in the circumferential direction of the rotor.

In embodiments of the present invention, due to the first and second slip rings extending in the radial direction and the commutator segment extending in the axial direction, the commutator assembly is relatively short in the axial and radial directions of the motor.

BRIEF DESCRIPTION OF THE DRAWINGS

A preferred embodiment of the present invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENT

Figure 1:
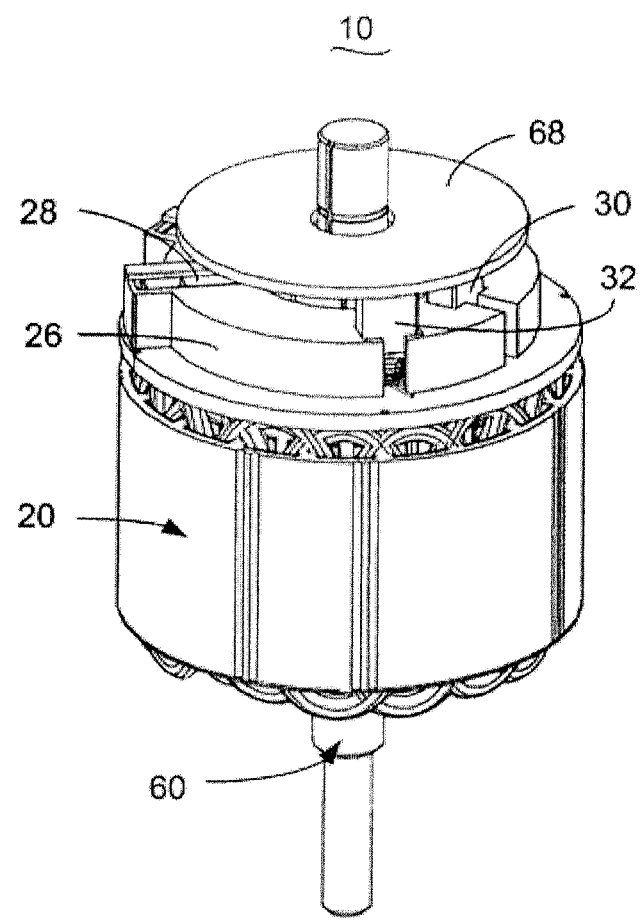
FIG. 1 illustrates a DC motor having a permanent magnet rotor and a commutator assembly, in accordance with the preferred embodiment of the present invention.

The DC motor 10 of FIG. 1, has a stator 20, brush gear and a permanent magnet rotor 60 rotatably disposed in the stator 20.

Figure 2:
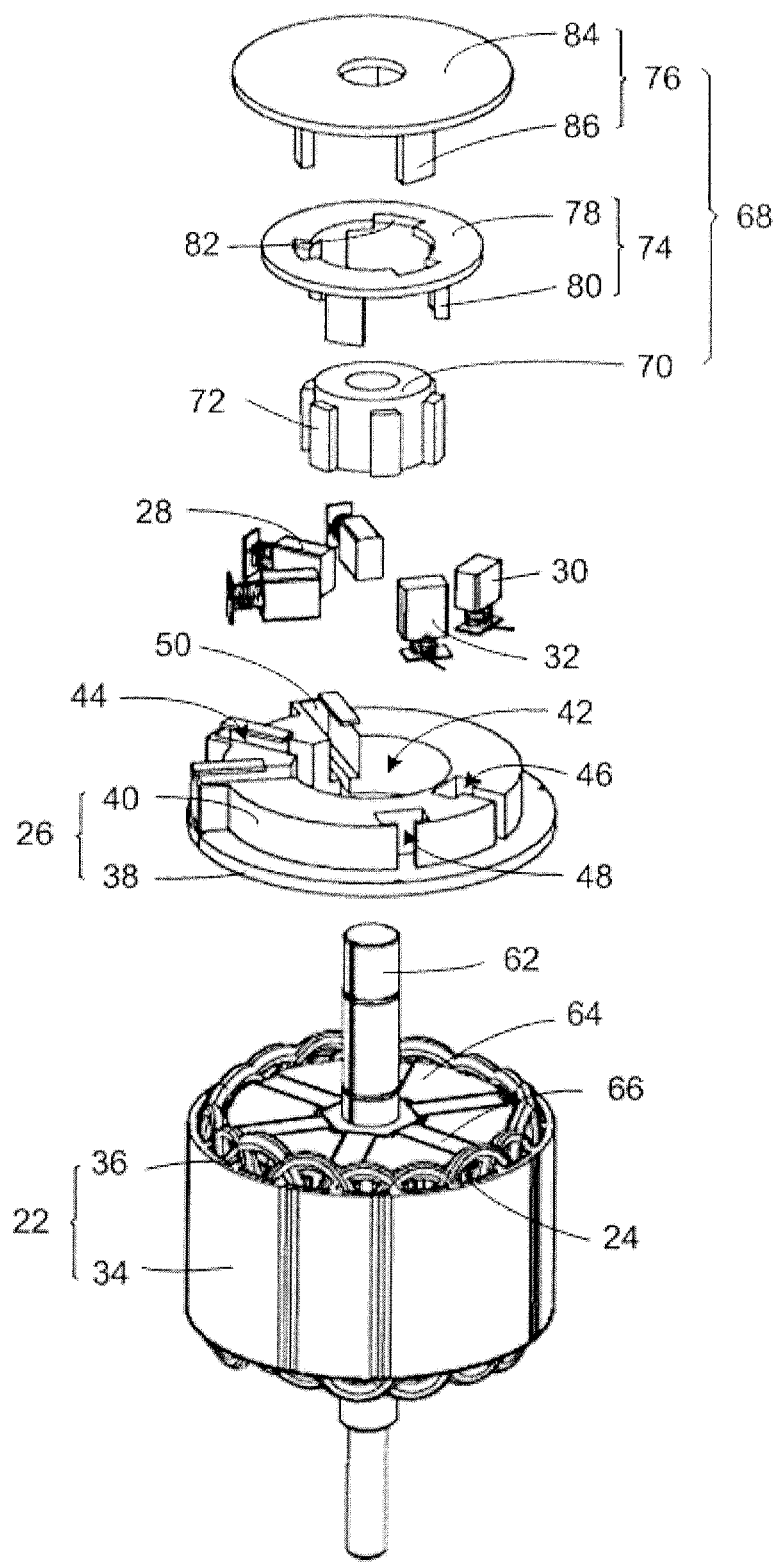
FIG. 2 is an exploded view of the motor of FIG. 1.
Figure 3:
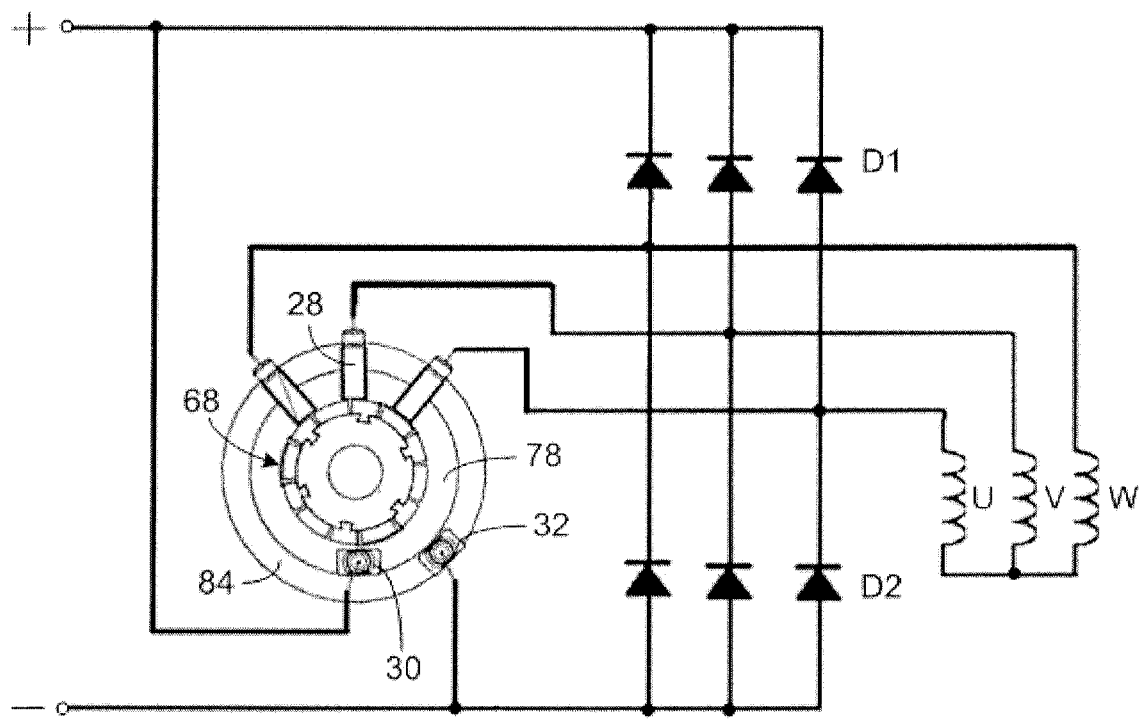
FIG. 3 is a schematic wiring diagram showing the connection between the brushes and the windings of the motor of FIG. 1.

As shown in FIGS. 2 and 3, the stator 20 includes a stator core 22 and a number of coils 24. The stator core 22 is made of a plurality of stacked laminations, forming a circular yoke 34 and a number of teeth 36 protruding radially inward from the yoke 34. The coils 24 are wound around corresponding teeth 36. The brush gear comprises a bracket or brush card 26, a number of commutating brushes 28, a positive pole brush 30, and a negative pole brush 32. The coils are arranged to correspond to three phases U, V, W, for example, and optionally are connected in star, which means that one end of each coil 34 is connected to a respective commutating brush 28 while the other end of each coil 24 are connected together.

Optionally, the brush card 26 is fixed to a case or housing (not shown) of the motor to which the stator core 22 is also fixed such that the brush card is fixed with respect to the stator. Brush card 26 includes a ring-shaped bottom plate 38 and a ring-shaped protrusion 40 rising from the bottom plate 38. As such, the brush card defines a circular hole 42 at the center thereof. Protrusion 40 defines a number of first slots 44, a second slot 46, and a third slot 48. Each first slot is surrounded by the bottom plate 38, a radially outer surface 50, and two side surfaces facing each other. The first slots 44 extend substantially radially and the angle included between adjacent slots is substantially the same. The second and third slots 46, 48 both extend axially from the top surface of the protrusion 40 to the bottom plate 38. The third slot 48 is arranged at a position closer to the radially outer edge of the protrusion 40 than the second slot 46. Thus the second and third slots are radially and circumferentially spaced.

The commutating brushes 28 are received in corresponding first slots 44, with a spring sandwiched between each commutating brush 28 and a corresponding outer surface 50 to resiliently urge the commutating brush 28 radially inwards. The positive and negative pole brushes 30, 32 are respectively housed in the second and third slots 46, 48, having springs sandwiched between the positive and negative pole brushes 30, 32 and the bottom plate 38 to resiliently urge the brushes 30, 32 away from the bottom plate 38.

Referring to FIG. 2, the rotor 60 includes a shaft 62, a rotor core 64, a number of permanent magnets 66, and a commutator 68. The rotor core 64 is fixed to the shaft 62 so as to rotate with the shaft. The rotor core defines a number of radially extending grooves or slots (not labeled) in which the magnets 66 are disposed. Thus the magnets are embedded in the rotor core forming what is known as an interior permanent magnet rotor. The magnets 66 are polarized in the circumferential direction of the rotor and adjacent magnets 66 have opposite polarity. The rotor core 64 is surrounded by the stator core 22, so that the magnetic poles of the rotor core 64 formed between adjacent magnets 66 interact with the magnetic poles formed by the teeth 36 of the stator core 22 when the coils 24 are energized.

The commutator 68 is fixed to the shaft 62 so as to rotate with the shaft and is received in the hole 42 of the bracket 26. The commutator 68 includes a substantially cylindrical insulating base 70, a number of insulating ribs 72, a first electrically conductive member 74, and a second electrically conductive member 76. The insulating base 70 is fixed to the shaft 62, preferably as a press fit. The ribs 72 evenly protrude from the outer surface of the base 70. The ribs may be formed integrally with the base as a monolithic structure or fixed to the base such as by a tongue in groove arrangement. The first member 74 includes a first slip ring 78 and a number of first bars 80 that preferably are formed integrally with the first slip ring 78 as a single piece stamping. The first slip ring 78 defines a number of recesses 82 at the radial inner edge thereof. The first bars 80 perpendicularly protrude from the first slip ring 78 and are evenly arranged in the circumferential direction. Each first bar 80 is arranged between adjacent recesses 82. The second member 76 includes a second slip ring 84 and a number of second bars 86 that preferably are formed integrally with the second slip ring 84 as a single piece stamping. The outer diameter of the second slip ring 84 is greater than that of the first slip ring 78. The second bars 86 protrude from the second slip ring 84 perpendicularly and are arranged at equally spaced intervals in the circumferential direction.

Each first bar 80 is sandwiched between adjacent ribs 72, with the first slip ring 78 abutting against the ribs 72. As such, the first member 74 is assembled to the base 70. The second member 76 is also assembled to the base 70, with the second bars 86 each running through a corresponding recess 82 and sandwiched between adjacent ribs 72. Each rib is sandwiched between a first bar 80 and a second bar 82. As such, the first bars 80 and the second bars 86 are fixed to the outer surface of the base 70 and are alternately arranged at equally spaced intervals in the circumferential direction of the base 70. The first member 74 is insulated from the second member 76, for example, by insulating paint or insulating film formed at the position where the two members would contact each other. Thus, the outer surfaces of the first and second bars 80, 86 jointly form a cylindrical commutator contact surface and the two slip rings form planar contact surfaces. The commutating brushes 28 are arranged to make sliding contact with the first and second bars 80, 86 alternatively as the commutator turns. The positive and negative brushes 30, 32 respectively make sliding contact with the first and second slip rings 78, 84 continuously.

Figure 4:
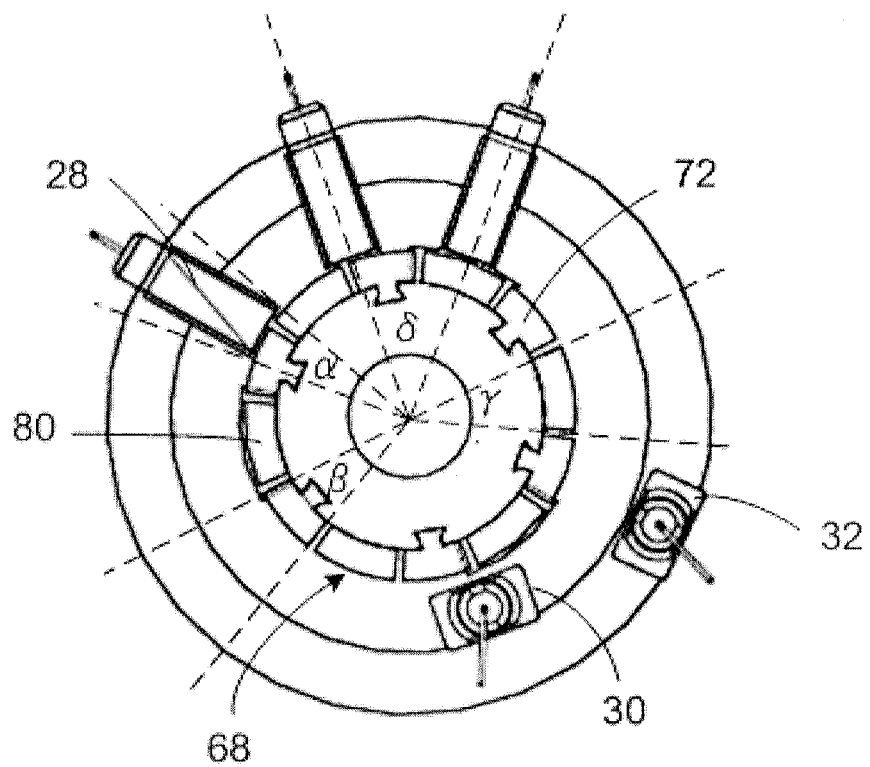
FIG. 4 is an illustration showing the relationship between the commutator and the brushes.

Referring to FIG. 4, angle "$\alpha$" corresponds to the arc length on an outer cylindrical surface of the commutator 68 that the commutating brush 28 occupies. Angle "$\beta$" corresponds to the arc length of the rib 72. Angle "$\gamma$" corresponds to the arc length of the first/second bar 80/86. Angle "$\delta$" is equal to the angle of separation between adjacent commutating brushes 28. These angles are arranged such that the commutating brushes 28 contact the first and second bars, corresponding to the positive and negative brushes, to maintain the rotation of the rotor 60. In detail, Angle "$\beta$" is greater than the Angle "$\alpha$", so that the commutating brushes 28 cannot simultaneously connect adjacent bars. Angle "$\delta$" is greater than Angle "$\gamma$", so that at least two bars are connected to different commutating brushes 28 simultaneously. In the present embodiment, Angle "$\alpha$" is between 12°-18°, Angle "$\gamma$" is between 27°-33°, Angle "$\beta$" is between 21°-27°, and Angle "$\delta$" is between 34°-46°. As such, during rotation, the windings are connected to the power source in the following sequence (the character "U"

means the U phase is connected to the positive pole of the power source, the character "−V" means the V phase is connected to the negative pole of the power source): . . . U−V, U−VW, −VW, −U−VW, −UW, −UVW, −UV, −UV−W, V−W, UV−W, U−W, U−V−W, U−V . . . .

As the first and second slip rings 78, 84 extend radially, the commutator 68 is shorter in the axial direction than if the slip rings extended axially. Thus, the whole DC motor 10 may be shorter in the axial direction. Also, as the outer diameter of the second slip ring 84 is greater than that of the first slip ring 78 which overlaps thereon, all of the brushes can be arranged at the side of the second slip ring 84, whereby space utilization is improved.

As shown in FIG. 3, preferably each phase is connected to the positive brush 30 and the negative brush 32 via a first diode D1 and a second diode D2 respectively. The cathodes of the first diodes D1 are connected to the positive brush 30, and the anodes of the second diodes D2 are connected to the negative brush 32. When the commutating brush 28 slides from a first/second bar 80, 86 to a rib 72, or from a rib to a bar, a sharp current change will occur in the commutating brush 28. As such, coils 24 of a winding corresponding to the commutating brush 28 will generate a current pulse of great value. In this condition, the first or second diode is turned on creating a current path to the power source for the current pulse. In this way, the current pulse is reduced and sparks generated between the commutating brushes 28 and the commutator bars 80, 86 are suppressed.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A direct current motor, comprising:
   a rotor comprising: a shaft, a rotor core fixed to the shaft, a plurality of permanent magnets fixed to the rotor core, and a commutator;
   a stator comprising a stator core surrounding the rotor core, and a plurality of coils wound on the stator core; and
   brush gear comprising a plurality of commutating brushes connected to corresponding coils, a first pole brush, and a second pole brush;
   wherein the commutator comprises a substantially cylindrical insulating base fixed to the shaft, a first member fixed to the base, and a second member fixed to the base and insulated from the first member;
   the first member comprises a first slip ring extending radially to form a first planar surface and a plurality of first bars electrically connected and substantially perpendicularly to the first planar surface, the first pole brush making continuously sliding contact with the first planar surface;
   the second member comprises a second slip ring extending radially to form a second planar surface and a plurality of second bars electrically connected and substantially perpendicularly to the second planar surface, the second pole brush making continuously sliding contact with the second planar surface; and
   the first bars and the second bars are fixed to the outer surface of the base and are alternately arranged at equally spaced intervals in the circumferential direction of the base and form a substantially cylindrical surface against which the commutating brushes make sliding contact,
   wherein the brush gear further comprises a substantially ring-shaped brush card,
   wherein the ring-shaped brush card comprises a ring shaped bottom plate and a ring-shaped protrusion rising from a top surface of the bottom plate, and
   wherein the protrusion defines a plurality of first slots, a second slot, and a third slot, the commutating brushes are received in corresponding first slots, the first pole brush and the second pole brush are respectively housed in the second and third slots.

2. The motor of claim 1, wherein the first bars are integrally formed with the first slip ring as a single piece stamping, and the second bars are integrally formed with the second slip ring as a single piece stamping.

3. The motor of claim 1, wherein the first slip ring and the second slip ring are arranged at the same side of all first and all second bars.

4. The motor of claim 3, wherein the first slip ring is arranged at a side of the base that faces away from the stator, the second slip ring is arranged at a side of the first slip ring facing away from the stator, the second bars extending through the first slip ring.

5. The motor of claim 4, wherein the first slip ring comprises a plurality of recesses at the radially inner edge thereof, the second bars passing through corresponding recesses along a direction from the first planar surface of the first slip ring to the first bars.

6. The motor of claim 4, wherein the outer diameter of the second slip ring is greater than that of the first slip ring, and the commutating brushes, the first pole brush, and the second pole brush are all arranged on a same side of the first slip ring.

7. The motor of claim 6, wherein the commutating brushes, the first pole brush, and the second pole brush are all disposed between the first slip ring and the rotor core.

8. The motor of claim 1, wherein the base, the first bars, and the second bars are surrounded by the brush card.

9. The motor of claim 8, wherein the brush card defines a circular hole at the center thereof.

10. The motor of claim 9, wherein each first slot is surrounded by the bottom plate, a radially outer surface, and two side surfaces facing each other, the first slots extend substantially radially and the angle included between adjacent slots is substantially the same.

11. The motor of claim 10, wherein the second and third slot both extend axially from the top surface of the protrusion to the bottom plate, the third slot is arranged at a position closer to the radially outer edge of the protrusion than the second slot.

12. The motor of claim 1, wherein the commutator further comprises a plurality of insulating ribs disposed between adjacent first bar and second bar.

13. The motor of claim 12, wherein the coils are arranged in three phases, the brush gear comprises three commutating brushes, and the commutator comprises three first bars and three second bars.

14. The motor of claim 13, wherein an Angle "$\alpha$" corresponding to the arc length occupied by one of the commutating brushes on an outer cylindrical surface of the commutator is between 12°-18°, an Angle "$\beta$" corresponding to the arc length of a rib is between 21°-27°, an Angle "$\gamma$" corresponding to the arc length of any one of the first or second bar is between 27°-33°, and an Angle "$\delta$" corresponding to the circumferential spacing of adjacent commutating brushes is between 34°-46°.

15. The motor of claim 1 further comprising a plurality of first diodes and a plurality of second diodes, wherein the coils correspond to a plurality of phases, each phase being connected to a positive power source via the first diode and to a negative power source via the second diode, with the anode of the first diode and the cathode of the second diode connected to the phase.

16. The motor of claim 1, wherein the magnets are embedded in the rotor core.

17. The motor of claim 16, wherein the magnets are fixed in grooves formed in the rotor core, the grooves extending radially and axially of the rotor core with the magnets being alternately polarised in the circumferential direction of the rotor.

* * * * *